(12) United States Patent
Park et al.

(10) Patent No.: US 12,471,191 B2
(45) Date of Patent: Nov. 11, 2025

(54) ELECTRIC RANGE

(71) Applicant: LG ELECTRONICS INC., Seoul (KR)

(72) Inventors: Myoeng Soo Park, Seoul (KR); Junghyeon Cho, Seoul (KR); Seunghak Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 825 days.

(21) Appl. No.: 17/826,772

(22) Filed: May 27, 2022

(65) Prior Publication Data
US 2022/0386429 A1 Dec. 1, 2022

(30) Foreign Application Priority Data
May 28, 2021 (KR) .......................... 10-2021-0069179

(51) Int. Cl.
*H05B 6/12* (2006.01)
(52) U.S. Cl.
CPC ..... *H05B 6/1254* (2013.01); *H05B 2206/022* (2013.01); *H05B 2213/04* (2013.01)
(58) Field of Classification Search
CPC ................ H05B 6/1254; H05B 6/1209; H05B 2206/022; H05B 2213/07; H05B 2213/04
See application file for complete search history.

(56) References Cited

U.S. PATENT DOCUMENTS

| | | |
|---|---|---|
| 2012/0024840 A1 | 2/2012 | Lee et al. |
| 2018/0279422 A1 | 9/2018 | Davenport et al. |
| 2019/0297687 A1 | 9/2019 | Kim et al. |

FOREIGN PATENT DOCUMENTS

| | | | | |
|---|---|---|---|---|
| CN | 101055094 A | * | 10/2007 | .............. F24C 7/082 |
| CN | 206617983 U | * | 11/2017 | |
| EP | 3 216 315 | | 9/2017 | |
| EP | 3 544 378 | | 9/2019 | |
| JP | 2010-170784 | | 8/2010 | |
| JP | 2017188475 A | * | 10/2017 | |
| KR | 10-2014-0124106 | | 10/2014 | |
| KR | 10-2014-0131118 | | 11/2014 | |
| KR | 10-1513698 | | 4/2015 | |
| KR | 10-2016-0025170 | | 3/2016 | |
| KR | 10-2020-0109091 | | 9/2020 | |

OTHER PUBLICATIONS

European Search Report dated Oct. 6, 2022 issued in EP Application No. 22175971.5.
Korean Office Action dated Jun. 30, 2025, issued in Application No. 10-2021-0069179.

* cited by examiner

*Primary Examiner* — Thien S Tran
(74) *Attorney, Agent, or Firm* — KED & ASSOCIATES

(57) ABSTRACT

An electric range is provided that may include a dedicated coil temperature sensor configured to measure a temperature of a working coil so as to monitor the temperature of the working coil in real time and actively respond to a working coil load condition, thereby remarkably increasing an operation time of the electric range.

17 Claims, 13 Drawing Sheets

ELECTRIC RANGE

CROSS-REFERENCE TO RELATED APPLICATION(S)

This application claims priority to and the benefit of Korean Patent Application No. 10-2021-0069179, filed in Korea on May 28, 2021, the disclosure of which is incorporated herein by reference in its entirety.

BACKGROUND

1. Field

An electric range is disclosed herein.

2. Background

Various types of cooking utensils or electric appliances are used to heat food or other items (hereinafter, collectively "food") at home or in a restaurant. Such cooking electric appliances may include gas range using gas and electric ranges using electricity.

An electric range may be largely classified into a resistance heating type and an induction heating type. An electrical resistance type may generate heat by applying a current to a non-metallic heating element, such as a metal resistance wire and silicon carbide, and may heat an object, for example, a cooking vessel or container, such as a pot or a frying pan, by radiating or conducting the generated heat. An induction heating type may apply high-frequency power to a coil and generate a magnetic field around the coil, and may heat a heating target made of a metal material using an eddy current generated in the magnetic field.

In other words, when a current is applied to a working coil or a heating coil, a heating target may be induction-heated to generate heat and the heating object may be heated by the generated heat. A conventional induction heating type electric range having the above configuration includes a heating portion or heater on which a working coil is wound, and a cover plate disposed on an upper surface of the heater.

The cover plate may have a heating target seated thereon to be induction-heated. The heater may include a temperature sensor configured to indirectly measure a temperature of a heating target to be induction-heated, and a fuse configured to sense overheating of the heater as a safety device. The temperature sensor and the fuse may be disposed in the heater. A temperature of the cover plate is measured to indirectly estimate the temperature of the heating target and detect whether the heater is overheated.

Korean Patent Laid-Open Publication No. 10-2016-0025170 (Patented Document 1), which is hereby incorporated by reference, discloses a configuration for detecting overheat of a heater using a fuse disposed in a center of the heater. However, a temperature sensor disclosed in Patent Document 1 may only sense the temperature of a cover plate or a heating target.

When the working coil is used for a long time under no load, such as when the electric range is used with a heating target not heated to a high temperature or when a working coil is used for power supply, a temperature of the working coil might rise gradually but the temperature sensor will fail to detect the rise. If the temperature of the working coil continuously rises, the power supply load to the working coil will increase. If a predetermined overload state is reached, there is a high possibility that the power supply to the working coil is cut off.

If a power supply cut-off or device use interruption state due to the overload occurs, there might be a problem in that an actual operation time is shorter than a scheduled operation time. In addition, due to the sudden stop of operation, the user has no choice but to suspect that the electric range is malfunctioning, which inevitably causes a problem of deteriorating product reliability for the electric range.

BRIEF DESCRIPTION OF THE DRAWINGS

Embodiments will be described in detail with reference to the following drawings in which like reference numerals refer to like elements, and wherein.

DETAILED DESCRIPTION

Figure 1:
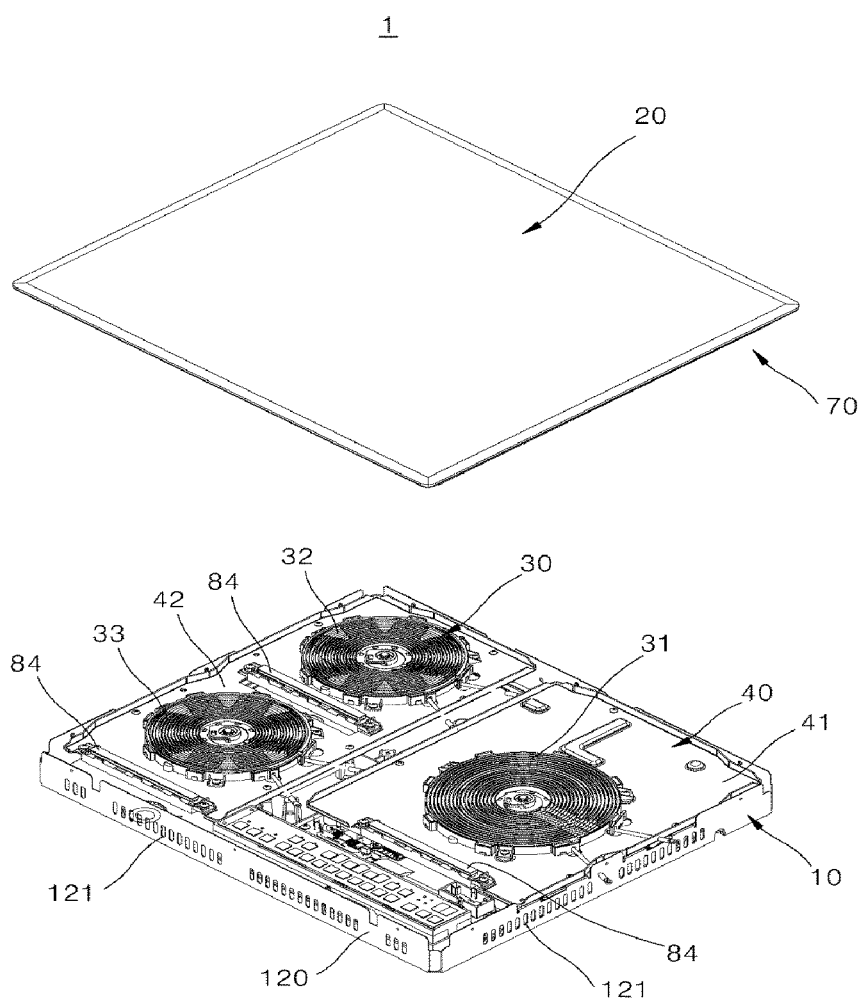
FIG. 1 is an exploded perspective view of an electric range according to an embodiment.
Figure 1:
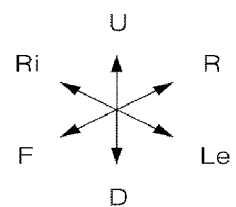

Aspects, features, and advantages are specifically described hereinafter with reference to the accompanying drawings such that one having ordinary skill in the art to which embodiments pertain can easily implement the technical spirit. Hereinafter, descriptions of known technologies in relation to embodiments are omitted if they are deemed to make the gist unnecessarily vague. Hereinafter, embodiments are described with reference to the accompanying drawings. In the drawings, identical reference numerals can denote identical or similar components.

The terms "first" and "second", for example, are used herein only to distinguish one component from another component. Thus, the components should not be limited by the terms. Certainly, a first component can be a second component unless stated to the contrary.

Throughout, each element may be singular or plural, unless stated to the contrary.

Hereinafter, expressions of 'a component is provided or disposed in an upper or lower portion' may mean that the component is provided or disposed in contact with an upper surface or a lower surface. The present disclosure is not intended to limit that other elements are provided between the components and on the component or beneath the component.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terms such as "include" or "has" are used herein and should be understood that they are intended to indicate an existence of several components, functions or steps, disclosed in the specification, and it is also understood that greater or fewer components, functions, or steps may likewise be utilized.

Throughout, the terms "A and/or B" as used herein can denote A, B or A and B, and the terms "C to D" can denote C or greater and D or less, unless stated to the contrary.

Hereinafter, embodiments will be described, referring to the accompanying drawings showing a configuration of an electric range 1 according to an embodiment.

Figure 2:
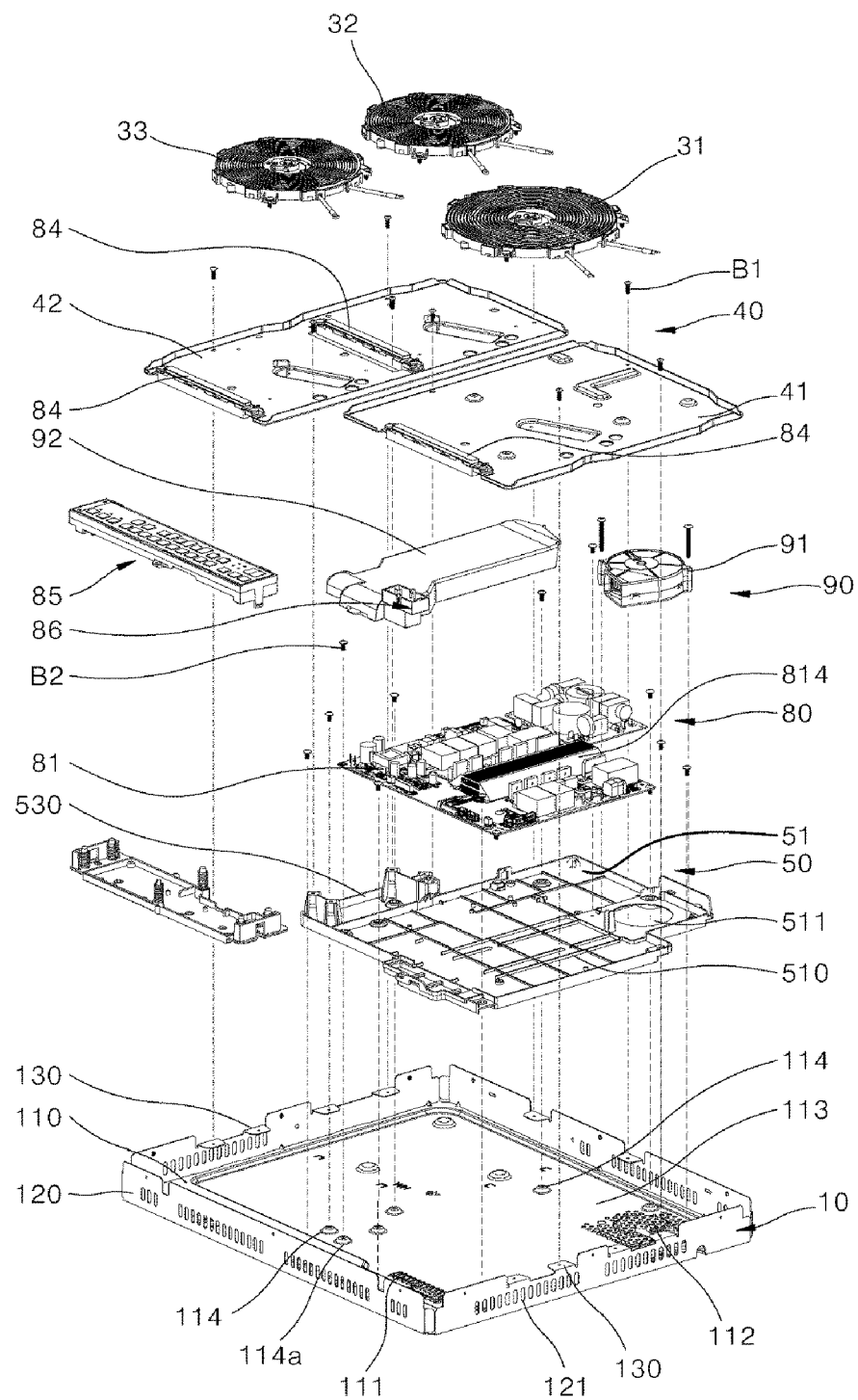
FIG. 2 is an exploded perspective view showing components of the electric range shown in FIG. 1, except a cover plate.

FIG. 1 is an exploded perspective view of an electric range according to an embodiment, in a state in which a cover plate is removed. FIG. 2 is an exploded perspective view showing components of the electric range shown in FIG. 1, except the cover plate. Referring to FIGS. 1 and 2, electric range 1 according to an embodiment will be described.

The electric range 1 according to this embodiment may be configured to heat a heating target based on an induction heating method. The heating target may be a tableware containing a metal material, for example, stainless steel and iron.

In the induction heating method, high-frequency power may be applied to a working coil 312, 322, and 332 to generate a magnetic field around the working coil 312, 322, and 332, and an eddy current generated by the magnetic field may be used in heating a heating target made of a metal material. More specifically, high-frequency power may be applied to a heating portion or heater 30 having a structure in which the working coil 312, 322, and 332 is disposed adjacent to a ferrite core, so that a magnetic field may be generated around the working coil 312, 322, and 332. When a heating target is placed in an area in the generated magnetic field, an eddy current may be induced in the heating object by the magnetic field and Joule's heat may be generated by the eddy current to heat the heating target. As the heating target is heated, food contained in the heating target may be heated.

The electric range may include a cover plate 20, the heater 30, an upper bracket 40, and a base bracket 50. The case 10 may be configured to define an exterior of the electric range and protect components of the electric range. For example, the case 10 may be made of a lightweight metal material, such as aluminum, for example; however, embodiments are not limited thereto.

The case 10 may be insulated to suppress heat generated by the working coil 312, 322, and 332 from being radiated to the outside. The case 10 may accommodate components of the electric range 1, such as the heater 30, the upper bracket 40, and a control circuit board module 80. A top of the case 10 may be open, and the open top may be closed by the cover plate 20.

The case 10 may be formed in a box shape by processing a plate-shaped material, for example. The case 10 may include a first casing 110, and a second casing 120.

The first casing 110 may define a bottom surface of the case 10. The first casing 110 may accommodate and support internal components installed in the electric range 1 in a downward direction. A plurality of f extending portions formed by press working may be provided as a means for facilitating the accommodation and supporting of the internal components.

A downward extending portion 113 among the plurality of extending portions may be formed by press work to protrude the first casing 110 in a downward direction (D-direction) as a whole. The first casing 110 may protrude in the downward direction so that a space in a vertical direction (U-direction) may be secured for the internal components. In addition, a rigidity of the first casing 110 may be increased.

An upward expending portion 114 may protrude upward from the downward extending portion 113 (U-direction), and may be formed as a circular bead as shown in the drawing, for example. The upward extending portion 114 may be formed at a plurality of positions, and may support a lower surface of the base bracket 50, which will be described hereinafter, to fix the base bracket 50.

A bolt hole 114a may be formed in the upward extending portion 114 to secure the base bracket 50 by using a board securing bolt, for example, so that the board securing bolt may penetrate the bolt hole 114a to extend therethrough. More specifically, the board securing bolt for securing the base bracket 50 may secure the base bracket 50 in a direction from an upper surface to a lower surface (D-direction). As the upward extending portion 114 protrudes from the downward extending portion 113, there may be a margin for preventing the board securing bolt from extending downward over the first case 110.

The first casing 110 may include an air inlet hole 112 for through which air is drawn therein, and an air outlet hole 111 through which air is discharged therefrom, to facilitate cooling of the control circuit board module 80 provided therein and circuit elements mounted on the control circuit board module 80. As shown in FIG. 2, the air outlet hole 111 and the air inlet hole 112 may be provided in the form of a grill, thereby preventing inflow of foreign substances.

The second casing 120 may be bent from the first casing 110 and configured to define a lateral surface of the case 10. The second casing 120 may be bent from an edge of the first casing 110 in a vertical direction (U-D direction) to form a side wall of the electric range 1, so that the second casing 120 may surround the base bracket 50, which will be described hereinafter.

The second casing 120 may be formed on each side of the first casing 110 formed in a substantially quadrangular shape. The second casing 120 may reinforce a rigidity of the entire case 10. More specifically, the second casing 120 bent from the first casing 110 may be configured to prevent the plate-shaped first casing 110 from bending or being damaged by a weight of the internal components or an external force.

The second casing 120 may further include a plurality of ventilation hole 121 formed in a slit shape. The plurality of ventilation holes 121 may facilitate communication between an inside and an outside of the case 10 so that air may flow through the plurality of ventilation holes 121, thereby contributing to cooling of the internal components provided in the case 10.

A supporting flange 130 may be provided in an upper end of the second casing 120. The supporting flange 130 may be bent from an upper end of the second casing 120 toward the inside of the case 10, and may serve to support the upper bracket 140, which will be described hereinafter, from a lower surface. For example, the supporting flange 130 may be formed at a plurality of positions by bending upper ends of a left or first lateral surface, a right or second lateral surface and a rear surface of the second casing 110. A securing hole 131 for bolting fastening may be provided in each of the supporting flanges 130.

A bottom surface of the upper bracket 40 may be disposed on an upper surface of the supporting flange 130. The upper bracket 40 and the supporting flange 130 may be coupled to each other by a securing means, such as a bracket securing bolt B1, for example. A left or first lateral side end and a rear end of the first upper bracket 41 and a right or second lateral side end and a rear end of the second upper bracket 42 may be supported and coupled to each other by the supporting flange 130. The right side end of the first upper bracket 41 and the left side end of the second upper bracket 42 may be supported by a supporting bracket 530, which will be described hereinafter.

The cover plate 20 may be coupled to an upper end of the case 10 and a heating target may be placed on the upper surface of the cover plate 20. The cover plate 20 may be configured to close the open top of the case 10 to protect the internal components of the case 10.

The heating target may be placed on the upper surface of the cover plate 20 and a magnetic field generated from the heater 30 may pass through the cover plate 20 to reach the heating target. For example, the cover plate 20 may be made of a material having excellent heat resistance, such as ceramic or tempered glass, for example; however, embodiments are not limited thereto.

An input interface (not shown) configured to receive an operation input from the user may be provided on the upper surface of the cover plate 20. The input interface may be disposed on a predetermined area of the upper surface of the cover plate 20 and display a specific image.

The input interface may receive a touch input from the user, and the electric range 1 may be operated based on the received touch input. For example, the input interface may be a module configured to input a desired heating intensity or heating time by a user, and may be implemented as a physical button or a touch panel.

A touch circuit board module 85 configured to receive a user's touch manipulation input may be provided under the input interface, that is, under the cover plate 20. The touch circuit board module 85 may include a plurality of key switches 851 and a touch circuit board 851 on which the plurality of key switches 851 are mounted. The user may input a command to the touch circuit board module 85 via the plurality of key switches 851 to control operation of the electric range 1.

In the electric range 1 according to an embodiment, an upper surface of the touch circuit board module 85 may be in close contact with a lower surface of the cover plate 20. The touch circuit board module 85 may be disposed at a position corresponding to the input interface.

The touch circuit board module 85 and the input interface may be connected to each other by a capacitive touch input method. Accordingly, when the user inputs a control command to the input interface, the control command may be input to the touch circuit board module 85.

In addition, a display may be provided on or at a predetermined area of the upper surface of the cover plate 20 and configured to display an operation state of the electric range 1. A light display region may be formed on the upper surface of the cover plate 20. A light emitting diode (LED) substrate module 84 may be disposed under the cover plate 20, corresponding to the light display region. The light irradiated from the LED substrate module 84 may be transmitted to the user via the light display region. For example, the LED substrate module 84 may be fixedly disposed on the upper bracket 40, which will be described hereinafter. The upper bracket 40 may include a plurality of substrate supporting portions or supports 417 and 427 to support the LED substrate module 84.

The light display region and the LED substrate module 85 may be disposed in or at positions corresponding to each other. When a plurality of LED substrate modules 84 is provided, a same number of light display regions may be disposed on the upper surface of the cover plate 20.

The electric range 1 according to one embodiment may further include a cover bracket 70 configured to support the cover plate 20 and connect the cover plate 20 to the case 10. As shown in FIG. 1, the cover bracket 70 may be disposed on or at an outside of the upper bracket 40 and the case 10, and may be coupled to the case 10, to support the cover plate 20. For example, the cover bracket 70 may be coupled to the case 10 by a securing means, such as a case securing bolt (not shown), for example.

A plurality of the cover bracket 70 may be provided, and each of the plurality of cover brackets 70 may be disposed on or at a position corresponding to each side of the cover plate 20 formed in a quadrangle. For example, a total of fourth cover brackets 70 may be disposed on respective sides of the rectangular cover plate 20.

A plurality of the heaters 30 may be provided disposed under the cover plate 20, to heat a heating target. A total of three heaters 30 are shown in the accompanying drawings.

The plurality of heaters 30 may all employ the induction heating method, or some of the heaters 30 may employ the induction heating method and the others may be a highlight heating device using an electric resistance heating method, so that the electric range 1 may be configured as a so-called "hybrid range".

Hereinafter, the electric range 1 including a plurality of heaters 30 all employing the induction heating method will be described.

The plurality of heaters 30 may be configured to have a same heating capacity or different heating capacities from each other. The accompanying drawings show an example of the plurality of heaters including first heater 31, second heater 32, and third heater 33; however, embodiments are not be limited thereto. An example of the first heater 31, the second heater 32, and the third heater 33 having different heating generation capacities will be described as a standard.

The first heater 31 may be secured to the first upper bracket 41. The second heater 32 and the third heater 33 may be secured to the second upper bracket 42.

The heaters 31, 32, and 33 may include core frames 311, 322, and 332, respectively. The working coils 312, 322, and 332 may be spirally wound around upper surfaces of the core frames 311, 321, and 331, respectively, and ferrite cores 313, 323, and 333 may be mounted on lower surfaces of the core frames 311, 321, and 331, respectively. Accordingly, when high-frequency power is applied to the working coils 312, 322, and 332, a magnetic field may be formed around the ferrite core 313, 323, and 333, and an eddy current may be formed in a heating target by the formed magnetic field.

Each of the working coils 312, 322, and 332 may include a pair of outgoing wires 312a, 322a, and 332a. An outgoing tip terminal may be provided at ends of each lead wire 312a, 322a, and 332a.

A temperature sensing portion or sensor 60 may be provided in a center of each heater 31, 32, and 33. More specifically, a first temperature sensing portion or sensor 61 may be provided in the first heater 31, and a second temperature sensing portion or sensor 62 may be provided in the second heater 32. A third temperature sensing portion or sensor 63 may be provided in the third heater 33.

The first temperature sensor 61 may include a first plate temperature sensor 611 configured to sense a temperature of the cover plate 20 directly above the first heater 31, a first thermal fuse 613 configured to detect whether the temperature of the cover plate 20 increases above a preset or predetermined threshold temperature, a first coil temperature sensor 612 configured to sense a temperature of the first working coil 312, and a first sensor holder 614 in which the first plate temperature sensor 611 and the third thermal fuse 613 are mounted. Similarly, the second temperature sensor 62 and the third temperature sensor 63 may have substantially a same configuration as the first temperature sensor 61, respectively. The second temperature sensor 62 may include a second plate temperature sensor 621, a second coil temperature sensor 622, a second thermal fuse 623, and a second sensor holder 624. The third temperature sensor 63 may include a third plate temperature sensor 631, a third coil temperature sensor 632, a third thermal fuse 633, and a third sensor holder 634.

The first to third plate sensors 611, 621, and 631 may directly contact a lower surface of the cover plate 20 so as to measure the temperature of the cover plate 20. Sensing surfaces may be disposed to maintain a contact state with the lower surface of the cover plate 20 at all times.

The first to third coil temperature sensors 612, 622, and 632 may be disposed on lower surfaces of the working coils 312, 322 and 332, and may directly contact the working coils 312, 322 and 332 so as to measure the temperature of the working coils 312, 322 and 332. Sensing surfaces may be disposed to maintain a contact state with the working coils 312, 322 and 332 at all times.

The first to third fuses 613, 623, and 633 may serve as a kind of a thermostat configured to disconnect an internal circuit when the temperature of the cover plate 20 increases above a preset or predetermined threshold temperature. When internal circuits of the first to third thermal fuses 613, 623, and 633 are cut off, the power supplied to the working coils 312, 322 and 332 may be immediately cut off to discontinue operation of the heaters 31, 32 and 33 in which overheating occurs.

The heaters 31, 32 and 33 may be disposed on and supported by the upper bracket 40. As in the example shown in the drawing, a plurality of the upper bracket 40 may be provided. The upper bracket 50 may include first upper bracket 41 that supports the first heater 31, and second upper bracket 42 that supports the second heater 32 and the third heater 33.

The upper bracket 40 may be made of a lightweight metal material, for example, aluminum; however, embodiments are not be limited thereto. The first upper bracket 41 may include a first upper plate 411 and a second upper plate 412. The first upper plate 411 may define a bottom surface of the first upper bracket 41 and the first heater 31 may be mounted on the first upper plate 411. The second upper bracket 42 may include a first upper plate 421 and a second upper plate 422. The first upper plate 421 may define a bottom surface of the second upper bracket 42, and the second heater 32 and the third heater 33 may be mounted on the first upper plate 421.

The first upper plate 411 of the first upper bracket 41 and the first upper plate 421 of the second upper bracket 42 may completely cover a main circuit board module 81 and a power circuit board module 83 provided under the first upper plates 411, 421 in the vertical direction (U-D direction). Due to this structure, the first upper plate 411 of the first upper bracket 411 and the first upper plate 421 of the second upper bracket 42 may serve to shield the electromagnetic field and electromagnetic waves generated from the heater 30 from reaching elements mounted on the main circuit board module 81 and the power circuit board module 83. More specifically, the first upper bracket 41 and the second upper bracket 42 may be configured to improve electromagnetic compatibility (EMC) and electromagnetic interference (EMI) performance of the circuit boards.

The second upper plate 412 of the first upper bracket 41 and the second upper plate 422 of the second upper bracket 422 may be bent from respective first upper plates 411 and 421 in the vertical direction (U-D direction) of the electric range 1. As shown in the drawing, the second upper plates 412 and 422 may be formed at sides of the first upper plates 411 and 421 formed in a substantially quadrangular shape.

A rigidity of the first upper bracket 41 and the second upper bracket 42 may be reinforced as a whole by the second upper plates 412 and 422. That is, the second upper plates 412 and 422 may prevent the plate-shaped first upper plates 411 and 421 from being bent or damaged by the weight of the internal components including the heater 30 or an external force.

Each of the first upper plates 411 and 421 may include the pair of outgoing wires 312a, 322a and 332a discussed above, and a plurality of insertion holes penetrated by lead wires (not shown) of the temperature sensor 60. For example, the plurality of insertion holes may include a first insertion hole 414 and 424 through which one of the pair of the outgoing wires 312a, 322a, and 332a passes, and a second insertion hole 415 and 425 through which the other one of the outgoing wires passes, and a third insertion hole 416 and 426 through which a lead wire of the temperature sensor 60 passes. The pair of lead wires 312a, 322a, and 332a and the lead wire of the temperature sensor 60 may pass through the insertion holes and extend in the downward direction (D-direction), thereby being electrically connected to the control circuit board module 80.

In addition, the first upper plate 411 and 421 may include a plurality of extending portions that protrudes in the upward direction (U-direction) or the downward direction (D-direction). The plurality of extending portions that protrudes in the downward direction (D-direction) may be referred to as an anti-pressing portions 411a, 421a. The anti-pressing portions 411a, 421a may serve to prevent the lead wires 312a, 322a that extend outward in a radial direction (r-direction_ from a center of each heaters 31, 32, and 33 among the pair of lead wires 312a, 322a, and 332a from being pressed in a mounting process of the heaters 31, 32, and 33. More specifically, the anti-pressing portions 411a, 421a may serve as passages for the outgoing wire 312a, 322a, and 332a that extend outward from the center of the heaters 31, 32, and 33.

The extending portion that protrudes in the upward direction (U-direction) may be referred to as a securing portion 413. The securing portion 413 may support the heaters 31, 32, and 33, and may prevent the securing means, such as bolts, from extending in the downward direction (D-direction) after passing through the first upper plate 411 and 421. In other words, the securing portion 413 may provide a margin for preventing the securing means, for example, bolts, from interfering with the control board circuit module 80 disposed in the downward direction (D-direction).

The LED substrate module 84 may be disposed on each of the first upper bracket 41 and the second upper bracket 42. Substrate support portions 417 and 427 that support the LED substrate module 84 may be formed in the first upper plate 411 of the first upper bracket 41 and the first upper plate 421 of the second upper bracket 421, respectively. The substrate supporting portions 417 and 427 may be formed by partially cutting-away the first upper plate 411 of the first upper bracket 41 and the first upper plate 421 of the second upper bracket 42.

In the example shown in the drawing, one substrate supporting portion 417 may be provided in the first upper bracket 41 on which the first heater 31 is disposed. Two substrate supporting portions 427 may be formed in the first upper bracket 41 on which the second heater 32 and the third heater 33 are disposed.

A plurality of LEDs may be aligned on the LED substrate module 84. The plurality of LEDs may be luminescent when the heater 30 is turned on so that the user may be visually informed of whether the heater 30 is in operation or an operation state. The LED substrate module 84 may change a luminescent shape, and/or color, for example, of the plurality of LEDs to inform the user whether or not the electric range 1 is operating and the operation state.

The base bracket 50 may be disposed under the first upper bracket 41. The main circuit board module 81, and the power circuit board module 83 of the control circuit board module 80 may be mounted on the base bracket 50. The base bracket 50 may support the main circuit board module 81, the power circuit board module 83, and a ventilation module 90. The upward expending portion 114 formed in the first casing 110 may support a lower surface of the base bracket 50 at a plurality of positions.

Figure 3:
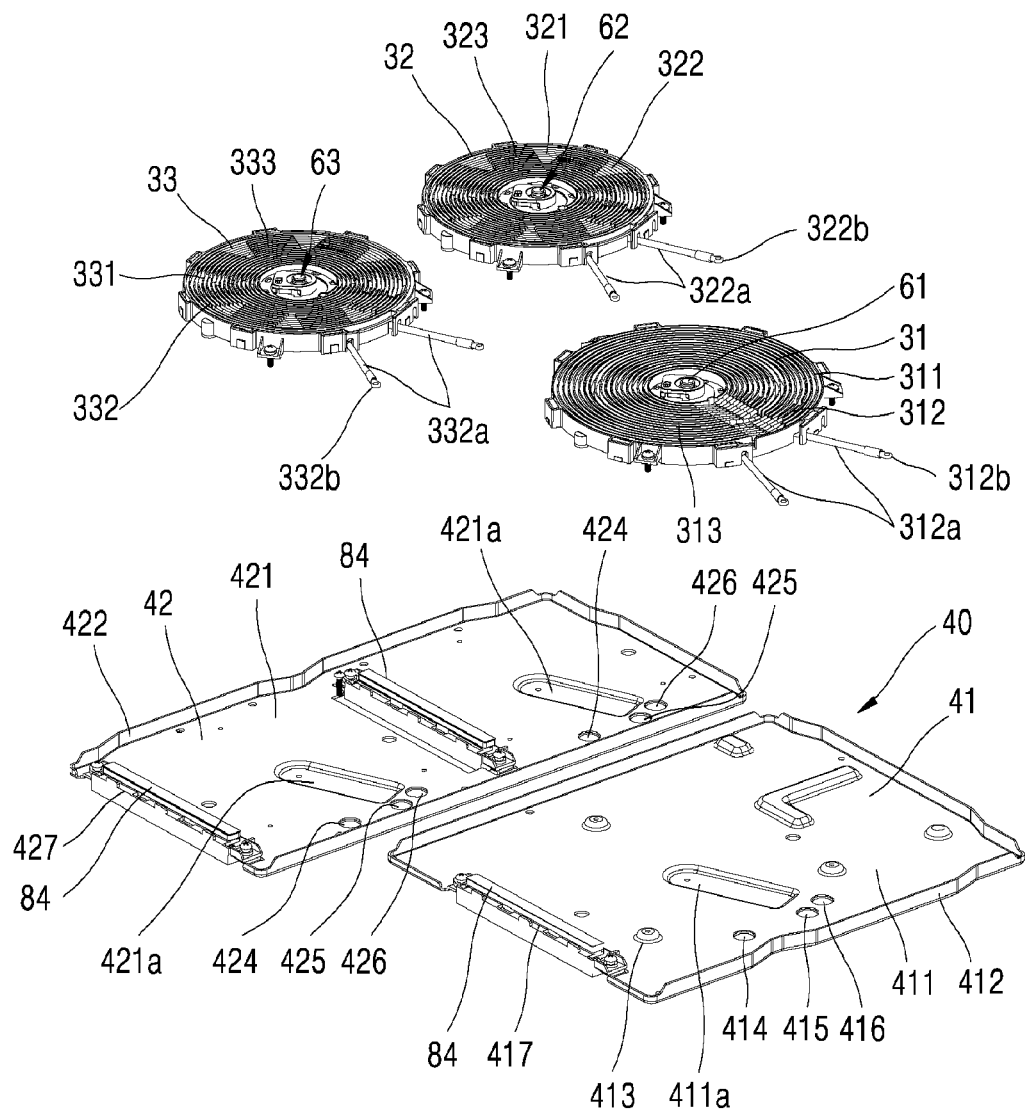
FIG. 3 is an exploded perspective view of a heater and an upper bracket shown in FIG. 2.
Figure 4:
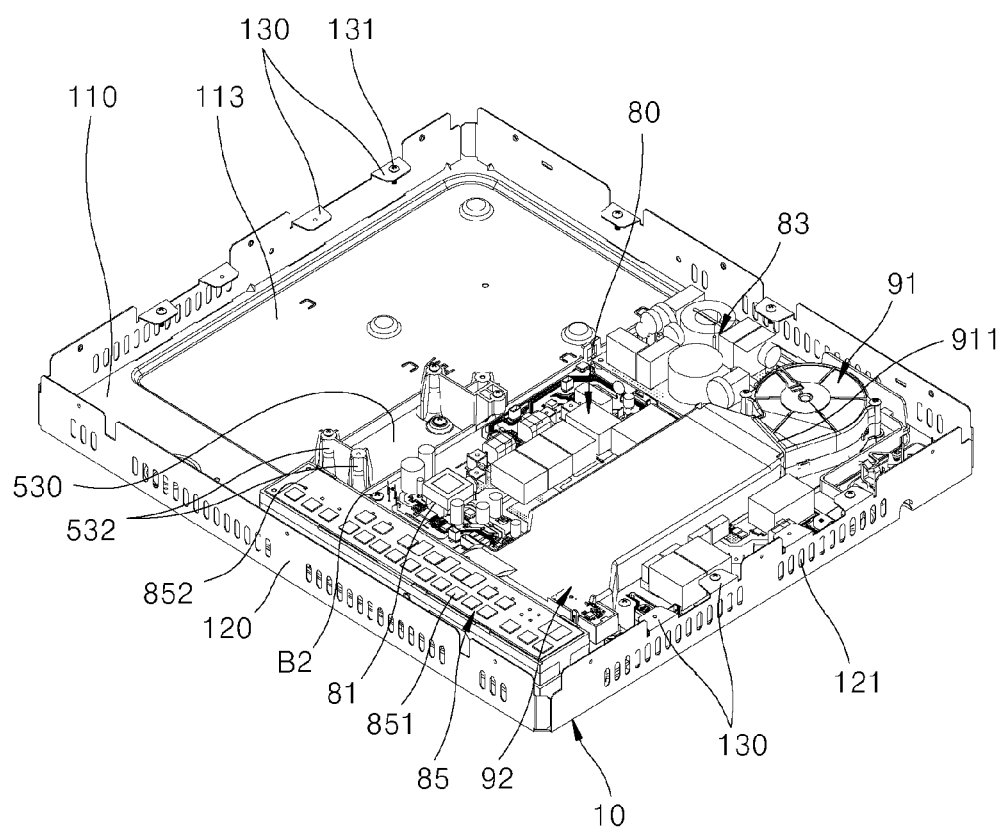
FIG. 4 is a perspective view showing an assembled state of a base bracket, a control circuit board module, and a ventilation module disposed in a case shown in FIG. 2.

As shown in FIGS. 3 and 4, the base bracket 50 may include a substrate bracket 51 including a bottom plate 510 and a lateral plate 520. The bottom plate 510 may define a bottom surface of the base bracket 50. The main circuit board module 81, the power circuit board module 83, and the ventilation module 90 may be mounted on an upper surface of the bottom plate 510.

Substrates 811 and 831 provided in the main circuit board module 81 and the power circuit board module 83 may be secured to the bottom plate 510 via a plurality of substrate securing bolts B2. Each substrate securing bolt B2 may extend to the upward extending portion 114 of the first casing 110 to be screw-fastened. The substrates 811 and 831 of the main substrate module 81 and the power circuit module 83 and the bottom plate 510 may be secured at the same time to the upward extending portion 114 of the first casing 110 using the substrate securing bolt B2.

Figure 5:
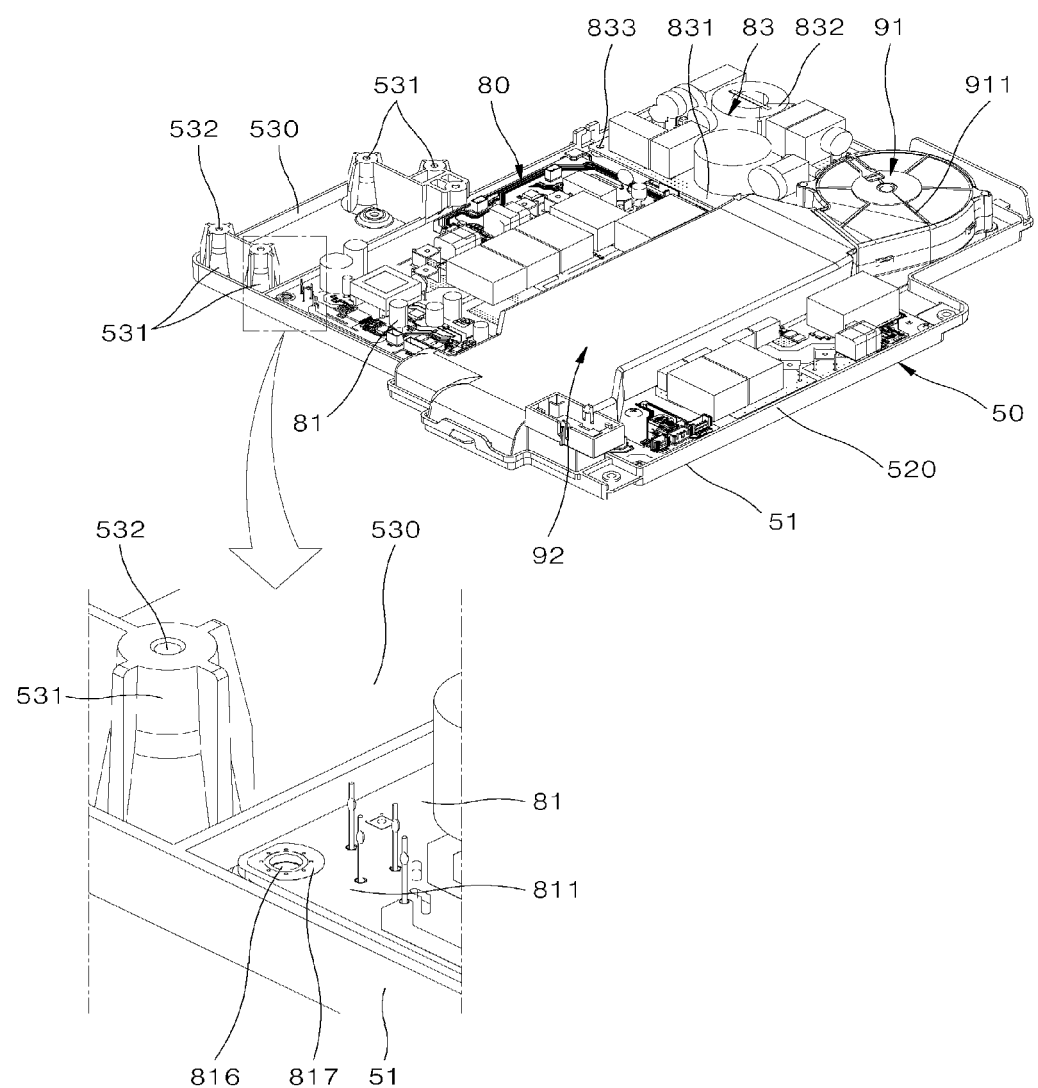
FIG. 5 is a perspective view showing a coupled state of the control circuit board module and the ventilation module with respect to the base bracket shown in FIG. 4.
Figure 6:
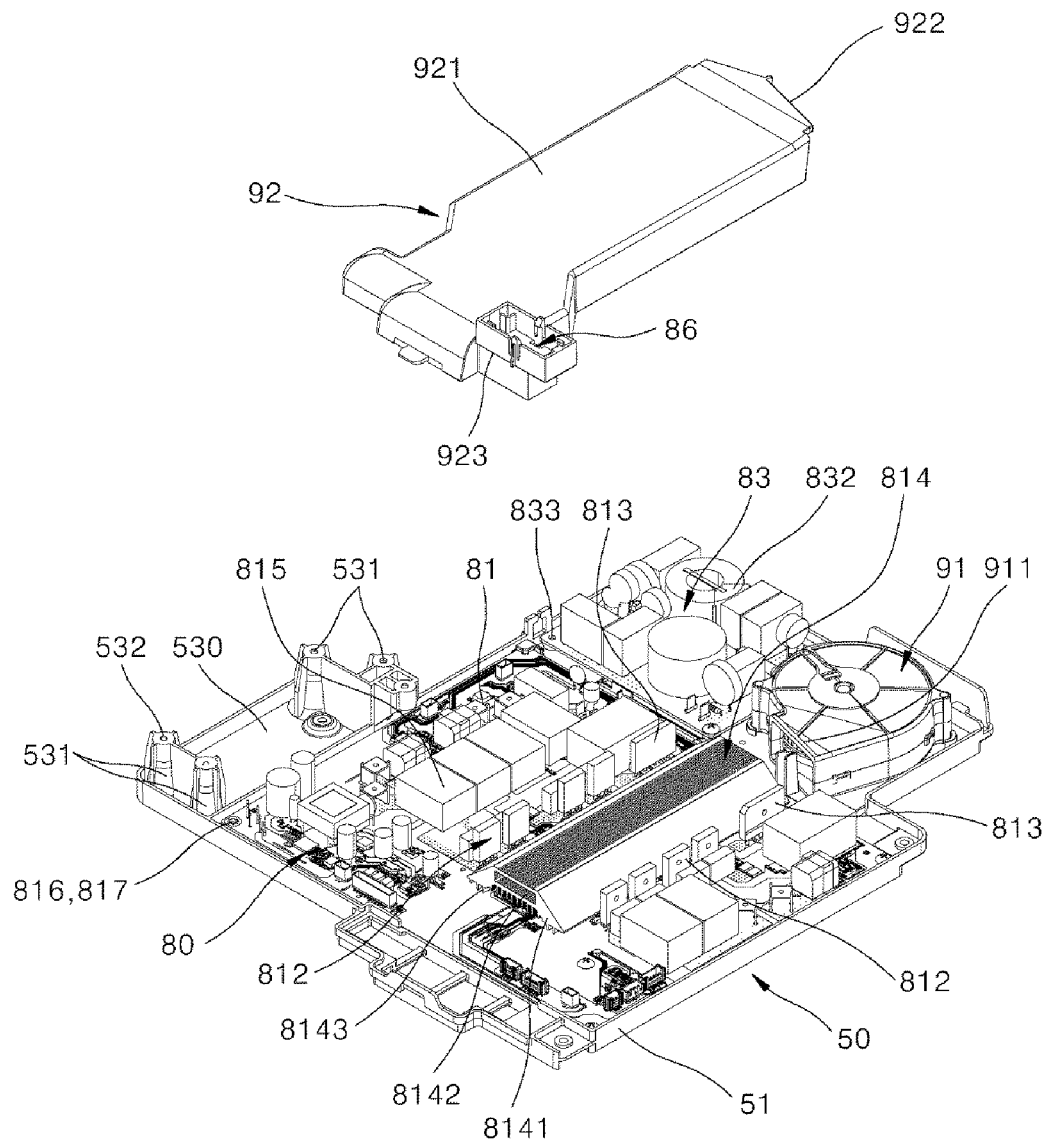
FIG. 6 is an exploded perspective view of an air guide removed from FIG. 4.

Further, any one of the substrate securing bolts B2 may be configured to act as a grounding means for grounding the main circuit board module 81 and the power circuit board module 83. For example, as shown in FIG. 5, a copper-foil-shaped ground terminal 817 may be formed around a bolt hole 816 of the main circuit board module 81 through which the substrate securing bolt B2 extends, and a head of the substrate securing bolt B2 may be electrically connected to the ground terminal 817. A stem of the substrate securing bolt B2 may be physically and electrically connected to the upward extending portion 114 of the first casing 110. Through such a simple configuration, the main circuit board module 81 may be effectively grounded to the first casing 110 by the substrate securing bolt B2. Although not shown, a same type of a ground terminal (not shown) may be provided in any one of the plurality of bolt holes 833 formed in the substrate 831.

The lateral plate 520 may extend in the upward direction (U-direction) of the electric range 1 from a lateral surface edge of the bottom plate 510. The lateral plate 520 may serve to reinforce the rigidity of the entire base bracket 50. That is, the lateral plate 520 may prevent the plate-shaped bottom plate 510 from being bent or damaged by the weight of the internal components, for example, the circuit board, or an external force. Further, the lateral plate 520 may also serve to protect the main circuit board module 81, the power circuit board module 83, and the ventilation module 90 from the external force applied to the bottom plate 510 in a lateral direction or frontward-rearward direction (F-R direction). For that, the lateral plate 520 may protrude to a position higher than a position in the vertical direction (U-D direction) of at least the main circuit board 811 and the power circuit board 831.

A supporting bracket 530 configured to support the first upper bracket 41 and the second upper bracket described above may be provided in or at a position corresponding to a center of the electric range 1. The supporting bracket 530 may extend parallel to a lateral surface of the substrate bracket 51 and a right surface with respect to the drawing. The supporting bracket 530 may be integrally formed with the substrate bracket 51. At this time, the supporting bracket 530 may be integrally formed with the substrate bracket 51, but may be configured to be easily decoupled from each other by an external force. For example, a connection portion between the supporting bracket 530 and the substrate bracket 51 may have a relatively weak strength.

The supporting bracket 531 may include a plurality of supporting bosses 531 that extends in the upward direction (U-D direction) from a bottom surface a first upper bracket toward the first upper bracket 41 and the second upper bracket 42 described above.

As mentioned above, left and rear ends of the first upper bracket 41 and right and rear ends of the second upper bracket 42 may be supported by and coupled to the supporting flanges 130. The right end of the first upper bracket 41 and the left end of the second upper bracket 42 may be supported and secured by the supporting bosses 531 of the supporting bracket 530. To couple the right end of the first upper bracket 41 and the left end of the second upper bracket 42 to each other, a coupling hole 532 may be formed in an upper end of each supporting boss 531.

In the example shown in the drawing, a total of five supporting bosses 531 may be provided in the supporting bracket 530. Not all of the five supporting bosses 531 may be used in coupling the right end of the first upper bracket 41 and the left end of the second upper bracket 42. For example, only three supporting bosses 531 out of the five supporting bosses 531 may be used in the coupling between the first upper bracket 41 and the second upper bracket 42.

The other supporting bosses 531 not used in the coupling according to the illustrated example may be used when the supporting bracket 530 supports the first upper bracket 41 and the second upper bracket 42 at a different position in another example. More specifically, when applied to another example of an electric range having a larger size than the electric range described above, the supporting bracket 530 may be decoupled from the substrate bracket 51 and moved to another position. When the supporting bracket 530 is applied to the larger-sized electric range, the other supporting bosses 531 not used in the coupling in this example may be used. The supporting bracket 530 is configured to be applicable to other examples, thereby facilitating component sharing and reducing manufacturing costs.

As described above, the main circuit board module 81 and the power circuit board module 83 of the control circuit board module 80 may be mounted on the base bracket 50. Although not limited thereto, the control circuit board module 80 may be understood as a higher concept including the above-noted LED substrate module 84, the touch circuit board module 85, and wireless communication substrate module 86 rather than the main circuit board module 81 and the power circuit board module 83.

As shown in FIGS. 3 and 4, the main circuit board module 81 may include a controller configured to control overall operation of the electric range 1, and may be electrically connected to the touch circuit board module 85 and the LED substrate module 84 described above. Accordingly, the main circuit board module 81 may receive a user's manipulation through the touch circuit board module 85 or a user's manipulation through the wireless communication board module 86 wirelessly or wiredly. The main circuit board module 81 may transmit operational information and status information to the LED substrate module 84 and a user's mobile terminal (not shown).

In addition, on or at a center of the main circuit board 811 may be mounted a CPU provided as a controller, that is, a microcontroller, a microcomputer or a microprocessor, a plurality of switching elements or switches 812 configured to convert power received from the power circuit board module 83 into high-frequency power and supply the converted power to the working coils 312, 322, and 332, and a bridge circuit element 813. The plurality of switching elements 812 may serve as a power converting module.

A plurality of insulated gate bipolar transistors (IGBT) may be applied as the plurality of switching elements. However, a IGBT type switching element is a very heat-generating component. If such generated heat is not maintained at an appropriate level, a life span of the switch element will be shortened or a malfunction of the switch element is highly likely to occur.

As a means for cooling the plurality of switching elements 812, a heat sink 814 configured to absorb heat generated in the plurality of switching elements 812 and the bridge circuit element 813 may be mounted on the main circuit board 811. As shown in FIG. 5, the heat sink 814 may include a hexahedral main body 8141 that extends along the frontward-rearward direction (F-R direction) of the electric range 1, and a plurality of heat dissipation fins 8143 that extends toward the main circuit board 811 from a lower surface of the body 8141.

An upper surface of the main body 8141 may be formed in a plane parallel to the main circuit board 811. Both lateral surfaces of the main body 8141 may be formed as inclined surfaces having a downward inclination.

The plurality of switching elements 812 and the bridge circuit element 813 may be attached to the lateral surfaces having the downward inclination. Accordingly, heat generated by the plurality of switching element 812 and the bridge circuit element 813 may be conducted through the lateral surfaces of the main body 8141.

A flow channel 8142 may be provided in the main body 8141, and extend in a straight line through front and rear surfaces of the main body 8141. Air may flow along the airflow channel 8142 to a ventilation fan-motor assembly 91 which will be described hereinafter. Heat from the plurality of switching elements 812 and the bridge circuit element 813 may be partially absorbed by the air flow inside of the airflow channel 8142.

Concavities and convexities (or unevennesses) may be formed on an inner surface of the airflow channel 8142 and an upper surface of the main body 8141 to expand a contact area for the air flow. The unevenness may extend in a straight line along an air flow direction, that is, in the frontward-rearward (F-R direction) to minimize flow resistance.

The plurality of heat dissipation fins 8143 may protrude from a lower surface of the main body 8141 and extend in the straight line, spaced a constant distance apart from each other. Accordingly, an air passage may be formed between each two neighboring heat dissipation fins adjacent to each other.

Some of the heat dissipation fins, in particular, the ones disposed adjacent to both lateral sides of a lower surface of the main circuit board 811 may directly contact the main circuit board 811. These heat dissipation fins may serve to support the heat sink 814 as a whole.

In a state in which the plurality of switching elements 812 and the bridge circuit element 813 are attached to the heat sink 814, the heat sink 814 may be covered by an air guide 92, which will be described hereinafter. The heat sink 814 may be spatially separated from other circuit elements outside of the air guide 92 by the air guide 92 of the ventilation module 90, and a cooling passage only for the heat sink may be formed by the air guide 92.

As shown in the drawing, a plurality of filter elements 815 may be disposed at a periphery of the air guide 92 to remove noise included in power output from the power circuit board module 83, which will be described hereinafter. The power circuit board module 83 may be disposed behind the main circuit board module 81. In general, the power circuit board module 83 may be modularized by mounting a high voltage device known as a switching mode power supply (SMPS) on the power circuit board 831. The power circuit board module 83 may convert external power into a stable-stated power before it is supplied to the switching elements 812.

The ventilation fan-motor assembly 91 of the ventilation module 90 may be disposed behind the main circuit board module 81, for example, on the base bracket 50 disposed behind the heat sink 814. The ventilation fan-motor assembly 91 may absorb external air drawn via the air inlet hole 112 of the first casing 110 and the through-hole 511 of the base bracket 50, and blow the air into the air guide 92.

As shown in the drawings, a ventilation fan applied to the ventilation fan-motor assembly 91 may not be limited; however, a sirocco fan may be used in consideration of location and spatial restrictions in which the ventilation fan is mounted. When the sirocco fan is applied, external air may be absorbed in from a bottom of the sirocco fan in a direction parallel to a rotational shaft, and the air may be accelerated and discharged radially outward.

To improve air ventilation efficiency, an outlet end 911 of the ventilation fan may be directly connected to an inlet of the air guide 92. External air forcedly blown by the ventilation fan may be drawn into the air guide 92 as a whole.

The air guide 92 may include a guide body 921 having a U-shaped cross-section and formed in a box shape, in a lower surface of which is open. The heat sink 814 may be mounted in an internal U-shaped space and the cooling passage dedicated to the heat sink 814 may direct the external air blown by the above-mentioned ventilation fan.

The guide body 921 may correspond in shape to the heat sink 814. When the guide body 921 extends along the frontward-rearward direction (F-R direction) of the electric range 1, as shown in FIG. 5, the heat sink 815 may be correspondingly arranged in a shape that extends along the frontward-rearward direction (F-R direction) of the electric range.

A rear surface of the guide body 921 may be partially open. The open rear surface may serve as an air introduction hole 922 through which the external air blown by the ventilation fan is introduced. Unlike the rear surface, a front surface and a lateral surface of the guide body 921 may be completely closed, and may perform a function of a partition wall configured to prevent the introduced external air from leaking to the outside.

The external air introduced into the cooling passage formed in the guide body 921 may flow forward while performing heat-exchange with the heat sink 814. The flow direction of the external air may be guided by the guide body 921 to finally flow in the downward direction (D-direction), thereby being discharged to the outside through the air outlet hole 111 of the first casing 110.

A substrate mounting portion 923 may be integrally formed with a front surface of the guide body 921, for example, a front left or first lateral area of the front surface. The substrate mounting portion 923 may protrude from the front left area in the upward direction.

The substrate mounting portion 923 may accommodate the above-mentioned wireless communication substrate module 86. A position of the substrate mounting portion 923 may be determined as a position which may minimize the influence of high-frequency noise generated by the heater 30 and the plurality of switching elements 812. A position which is most distant from the heater 30 and the plurality of switching elements 812 may be selected.

Figure 7:
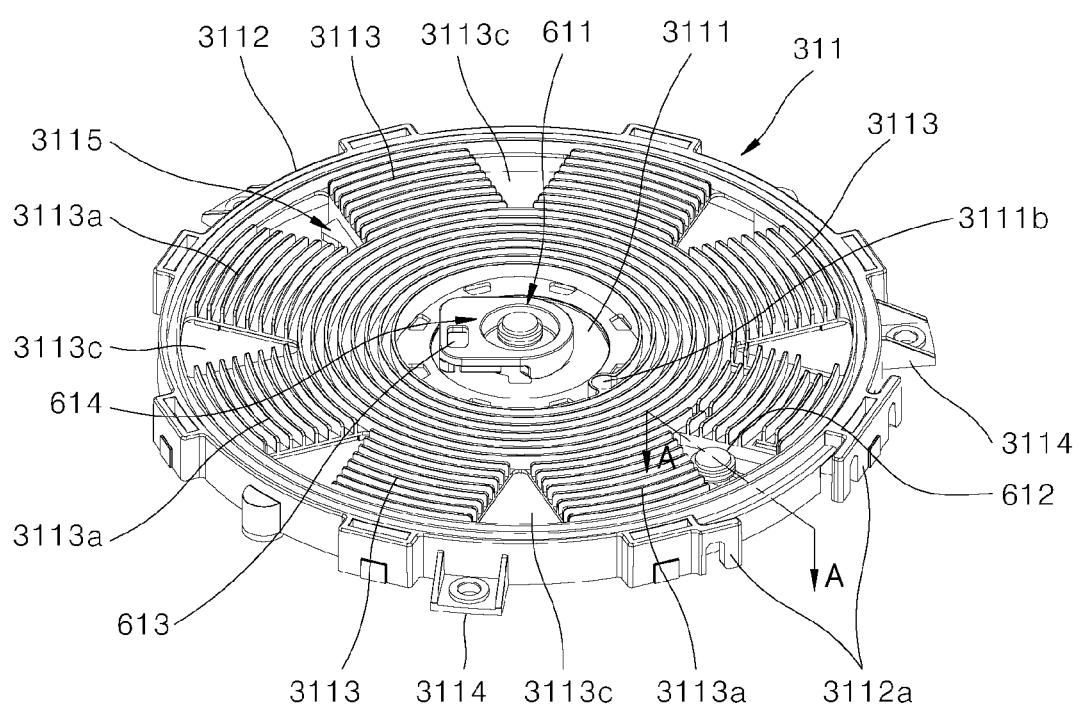
FIG. 7 is a top perspective view of a first heater shown in FIG. 2.

Referring to FIG. 7, of the heater 30 provided in the electric range 1 according to an embodiment will be described hereinafter. Referring to FIGS. 7-13, the first heater 31 will be described among the first to third heaters 31, 32, and 33 of the heater 30 as an example. Unless otherwise described hereinafter, the configuration of the first heater 31 may be almost identically applicable to the second heater 32 and the third heater 33, and repetitive description has been omitted.

Figure 8:
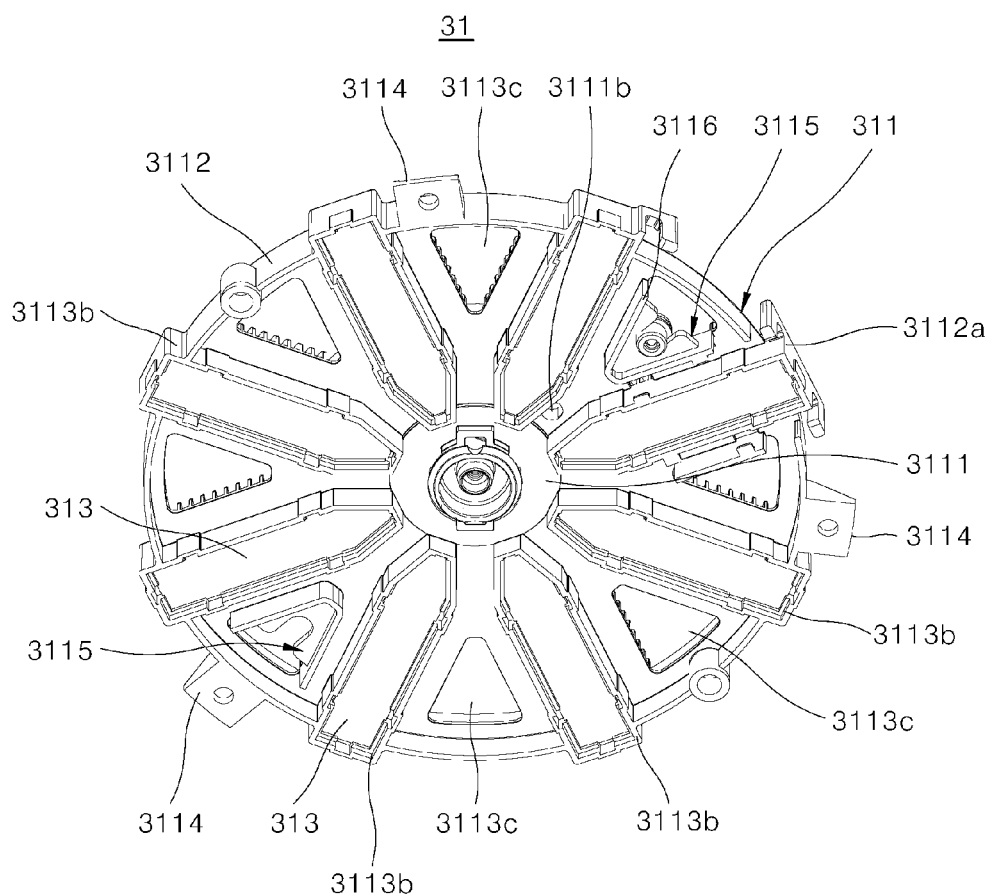
FIG. 8 is a bottom perspective view of the first heater shown in FIG. 7.
Figure 9:
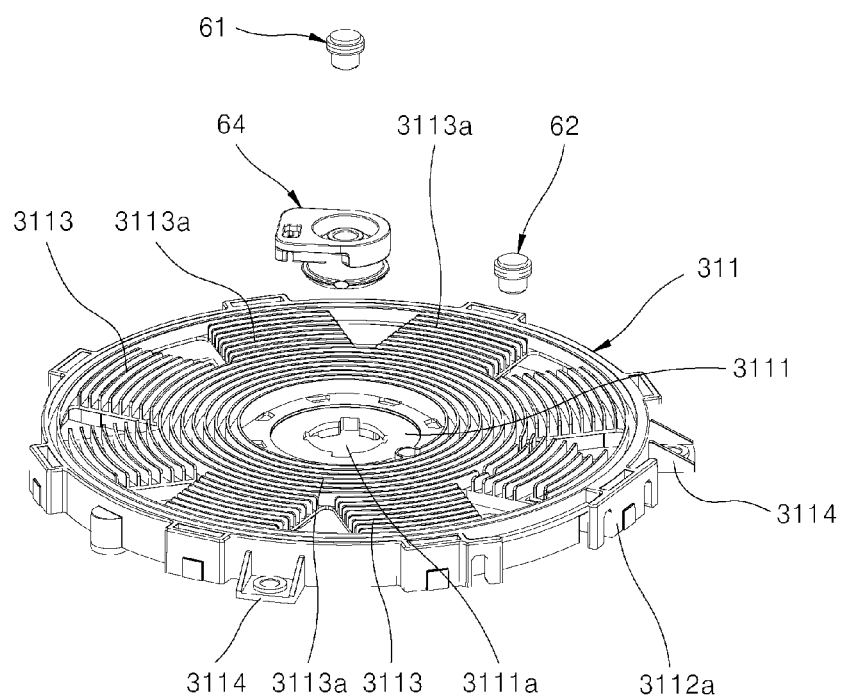
FIG. 9 is an exploded perspective view of the first heater of FIG. 7.

Referring to FIGS. 7 to 9, the first heater 31 may include working coil 312, core frame 311, and ferrite core 313. In FIGS. 7 to 9, the working coil 312 is omitted to describe the structure of the first heater 31 more clearly. However, as the first heater 31 on which the working coil 312 is wound is shown in other drawings, for example, FIGS. 12 and 13, there will be no difficulty in understanding the embodiments.

As shown in the drawings, the core frame 311 may be formed in a hollow cylindrical shape with an empty interior as a hole, and a lower surface thereof may be entirely open. The working coil 312 may be spirally wound on an upper surface of a disk portion 3111 corresponding to an upper surface of the core frame 311. To facilitate the spiral winding of the working coil 312, a guide rail 3113 may be provided on an upper surface of the disk portion 3111 and the guide rail 3113 may extend in a spiral shape while extending in the radial direction outside of the disk portion 3111 toward the radial direction inside thereof.

The guide rail 3113 may have a predetermined height in the upward direction (U-direction) from an upper surface of the disk portion 3111. A radial track 3113a may be provided between neighboring guide rails 3113 and the working coil 312 may be accommodated in the radial track 3113a.

A height of a protruding area of the guide rail 3113 may be greater than a diameter of the working coil 312 so as not to expose the working coil 312 in the upward direction (U-direction). In addition, when the working coil 312 is wound several times in multiple layers, the height of the guide rail 3113 may correspond to the number of layers of the working coil 312.

An upper end of the guide rail 3113 may be in directly contact with the lower surface of the cover plate 20 described above, and may be configured to support a load of a heating target which will be placed on the upper surface of the cover plate 20.

The core frame 311 of the disk portion 3111 may include a through hole 3113c formed in the vertical direction (U-D direction). The through hole 3113c may penetrate up to the guide rail 3113. That is, the through hole 3113c may facilitate communication between an inside and an outside of the core frame 311.

The through hole 3113c may be formed between core accommodating portions, which will be described hereinafter. More specifically, the disk portion 3111 and the guide rail 3113 provided between neighboring core accommodating portions 3113b may be partially open in the vertical direction (U-D direction) by the through hole 3113c.

As shown in FIGS. 7 to 9, a total of eight core accommodating portions 3113b may be provided as one example, and a total of eight through-holes 3113c may be formed correspondingly. The number of the core accommodating portions 3113b and the number of the through holes 3113c may be applied differently based on a size and heat generation load capacity of the first heater 31. However, embodiments are not limited thereto, but will be described based on an exemplary embodiment in which a total of eight through holes 3113c is provided.

As shown in the drawings, each through hole 3113c may be provided in a polygonal shape that gradually increases in width while extending outward in the radial direction (r-direction), and may be provided in a fan shape, for example. Such a shape of the through hole 3113c may be selected from any one that avoids the shape of the core accommodating portion 3113b and the shape of the ferrite core 313.

The inside and the outside of the through hole 3113c may be in communication with each other. Accordingly, the through hole 3113c may function as a passage through which heat transferred from the cover plate 20 and heat generated from the working coil 312 may escape to the outside without being trapped inside the core frame 311.

A cable guide wall 3116 may be provided under the disk portion 3111, and the cable guide wall 3116 may protrude in the downward direction (D-direction) along a circumference of the through hole 3113c. The cable guide wall 3116 may partition off the lead wire of the first thermal fuse and the outgoing wire (322a, see FIG. 3) of the working coil 322 from each other and guide them, thereby forming an extension passage thereof. The extension passage of the lead wires and the outgoing wires may be formed together by the cable guide wall 3116 and an accommodation wall of the core accommodating portion 3113b.

Figure 10:
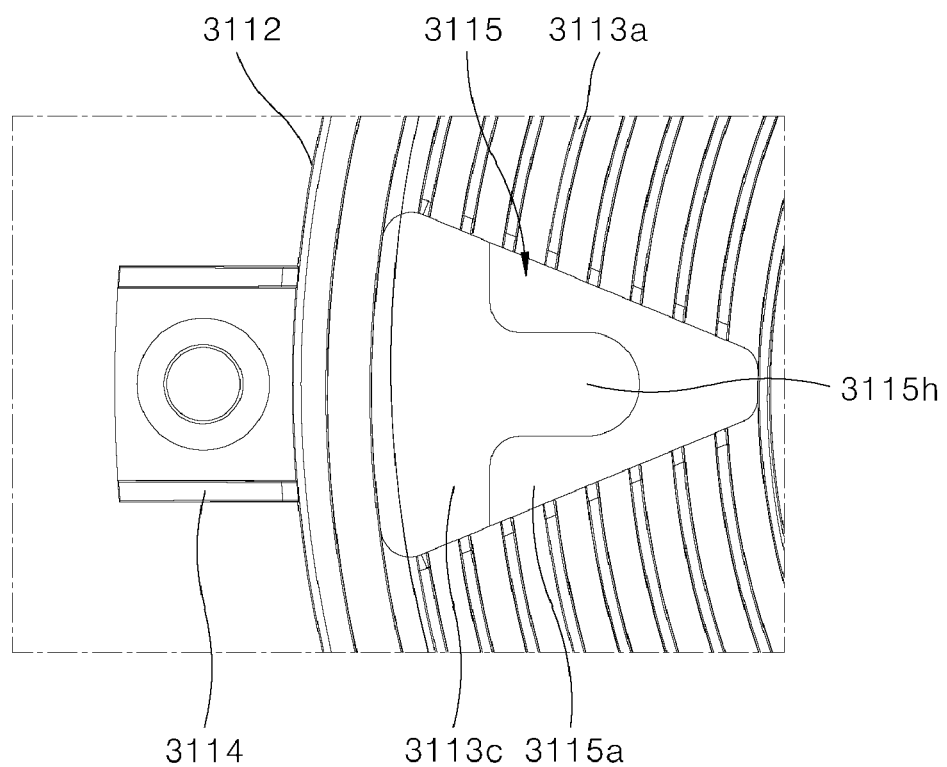
FIG. 10 is a partially enlarged view of the first heater, viewed from a top.

As shown in the drawings, the sensor bracket 3115 may be formed in the through hole 3113c and the first coil temperature sensor 612 may be disposed in the through hole 3113c. The sensor bracket 3115 may be formed in a flat plate shape that extends from an inner circumferential surface of the through hole 3113c to the inside of the through hole 3113c. Referring to FIG. 10, detailed configuration of the sensor bracket 3115 will be described hereinafter.

The working coil 312 wound around the guide rail 3113 in the radial direction and generating a magnetic field using the received high-frequency power may be made of Ritz wire having excellent durability, for example; however, embodiments are not limited thereto.

A circular area may be formed in the center of the disk portion 3111 of the core frame 311 in which the guide rail 3113 is not formed, in other words, a circular area in which the working coil is not wound. A coupling hole 3111a may be formed in the center of the circular area. The coupling hole 3111a may penetrate the disk portion 3111 in the vertical direction (U-D direction).

The first sensor holder 614 may be disposed in the coupling hole 3111a. The first plate temperature sensor 611 and the first thermal fuse 613 of the first temperature sensor 61 may be held in the first sensor holder 614.

As shown in FIG. 9, the first sensor holder 614 may include a first holder 6141 that holds the first plate temperature sensor 611 and a second holder 6142 that holds the first thermal fuse 613. The first holder 6141 may be formed in a hollow cylindrical shape and the second holder 6142 may be formed in a box shape coupled to a lateral surface thereof. The first holder 6141 and the second holder 6142 may be integrally formed, and may be made of a material having a predetermined elasticity to elastically support the first plate temperature sensor 611 and the first thermal fuse 613 and having heat resistance suitable for a high temperature environment.

As shown in FIG. 8, a lower end of the first holder 6141 may partially pass through the coupling hole 3111a to be exposed to or at the lower surface of the disk portion 3111. The first plate temperature sensor 611 mounted to an inner central surface of the first holder 6141 may be configured to sense the temperature of the lower surface of the cover plate 20, and may detect the temperature of the cover plate 20 by direct contact with the lower surface of the cover plate 20. That is, a sensing surface formed in the upper end of the first plate temperature sensor 611 may protrude in the upward direction (U-direction) to directly contact the lower surface of the cover plate 20.

A lead wire of the first plate temperature sensor 611 may have one or a first end connected to the lower end of the first plate temperature sensor 611 and the other or a second end electrically connected to the control circuit board module 80 after passing through a cable holder 3112a formed in an edge wall portion 3112 of the core frame 311.

The first thermal fuse 613 provided in the second holder 6142 may correspond to a safety device configured to open a circuit in case of overheating occurring when the temperature of the cover plate 20 exceeds a predetermined threshold temperature. The first thermal fuse 613 may be classified into a recovery type that automatically returns to an original state when the temperature falls below a predetermined value after the circuit is open due to occurrence of overheating occurs, and a non-recovery type that does not return to the original state. The first thermal fuse 613 applied to this embodiment may be the recovery type.

Similar to the first plate temperature sensor 611, the pair of lead wires (not shown) provided in the first thermal fuse 613 may be electrically connected to the control circuit board module 80 after penetrating the cable holder 3112a formed in the edge wall 3112 of the core frame 311. At the inner end of the guide rail 3113, which is a point at which the guide rail ends at an inside, may be formed a coil hole 3111b to guide the one end of the working coil 312 or the outgoing wire (322a, see FIG. 3) of the working coil 312 in the downward direction (D-direction).

As shown in FIG. 8, the plurality of ferrite cores 313 may be disposed on a lower surface of the disk portion 3111 provided in the core frame 311. The core accommodating portions 3113b may be radially disposed on the lower surface of the core frame 311.

As shown in the drawings, the core accommodating portion 3113b may have a polygonal box shape with an entirely open lower surface, for example. Each of the core accommodating portions 3113b may be defined by an accommodating wall that protrudes in the downward direction (D-direction) from the lower surface of the disk portion 3111 of the core frame 311.

The ferrite core 313 having a same shape as an inner shape of the core accommodating portion 3113b may be accommodated in each core accommodating portion 3113b. Accordingly, the number of core accommodating portions 3113b may be the same as the number of ferrite cores 313.

The core accommodating portion 3113b may be formed so that the plurality of ferrite cores 313 disposed radially may be spaced a predetermined distance apart from each other in a circumferential direction of the core frame 311. An inner end of each core accommodating portion 3113b and an inner end of each ferrite core 313 may gradually decrease in width while extending in an inward direction to secure such a distance.

A D-direction end of the core accommodating portion 3113b may directly contact the first upper plate 411 of the first upper bracket 41 described above. A load of a heating target transmitted to the disk portion 3111 may be transmitted to the core accommodating portion 3113b along the guide rail 3113, thereby being finally transmitted to the first upper plate 411 of the first upper bracket 41. In other words, the core accommodating portion 3113b may have a dual function of accommodating the ferrite core 313 and supporting an external load inside of the core frame 311.

A cylindrical edge wall 3112 may be integrally formed with a radial-direction (r-direction) outer end of the disk portion 3111 of the core frame 311, and may extend in the downward direction (D-direction). The cylindrical-shaped edge wall 3112 may be configured to define the inner space of the core frame 311, and may be integrally formed with the disk portion 3111. A height of the edge wall 3112 may be set based on a size of the ferrite core provided in the internal space of the core frame 311.

A plurality of coupling tabs 3114 configured to couple the core frame 311 to the above-described first upper bracket 41 may be provided on an outer surface of the edge wall 3112. A coupling hole may be formed in each of the coupling tabs 3114 so that a securing means, such as a bolt, for example, may extend through the coupling hole.

A cable holder 3112a may be provided in an outer surface of the edge wall 3112 and configured to guide the lead wire of the first plate temperature sensor 611, the lead wire of the first thermal fuse 613, and the outgoing wire (322a, see FIG. 3) of the working coil 312 extend outside of the core frame 311.

Referring to FIGS. 10 to 13, a first coil temperature sensor and a second bracket provided in an electric range according to an embodiment will be described hereinafter.

Figure 11:
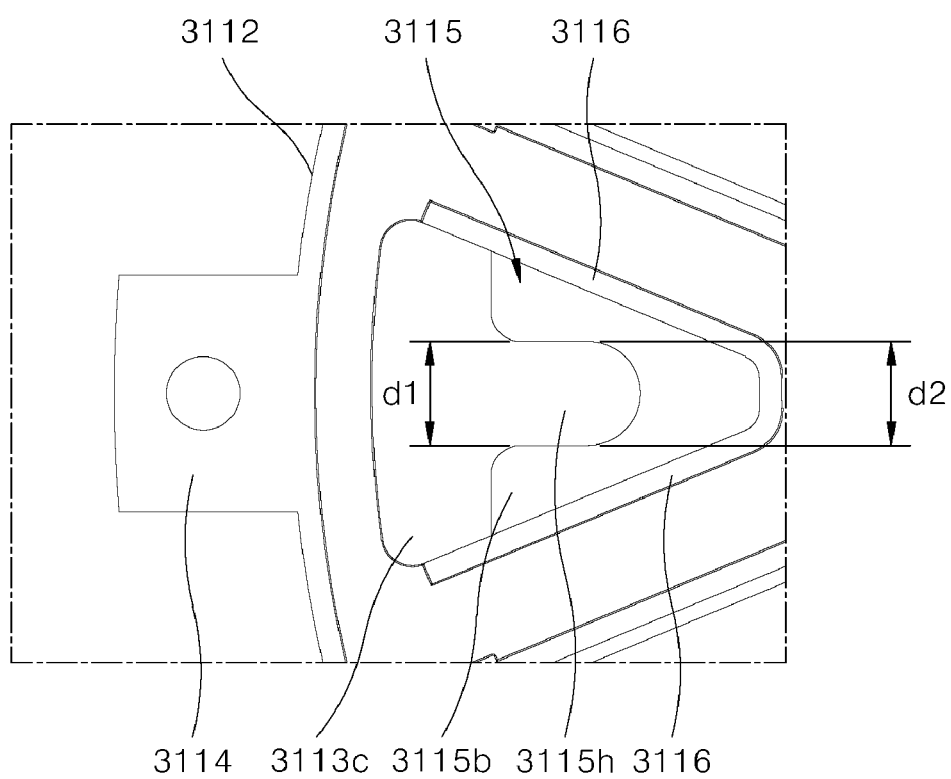
FIG. 11 is a partially enlarged view of the first heater, viewed from a bottom.

Referring to FIGS. 10 and 11, the sensor bracket 3113 as mentioned above may be provided in the through hole 3113c formed through the disk portion 3111 in the vertical direction (U-D direction). As shown in the drawings, the sensor bracket 3115 may be provided in a flat plate shape that extends from the inner circumferential surface toward the inside of the through hole 3113c. The sensor bracket 3115 may be formed to at least partially block the through hole 3113c.

FIGS. 10 and 11 show an embodiment of the sensor bracket 3115 formed in a flat plate that protrudes radially outward from a vicinity of an inner vertex of the fan-shaped through hole 3113c. However, embodiments are not limited thereto. On the contrary, the sensor bracket 3115 may be formed in a flat plate shape that extends from a radially outer arc position of a through hole 3113c toward the radially inner surface. For convenience, the following description will be based on the illustrated embodiment.

As will be described hereinafter, the first coil temperature sensor 612 may be disposed under the working coil 312 extended across the through hole 3113c. Accordingly, the sensor bracket 3115 may be disposed at a lower position in the vertical direction (U-D direction) rather than the guide rail 3113 to support the first coil sensor 612 disposed in the lower area of the working coil 312.

The sensor bracket 3115 may include a notched hole 3115h to which the first coil temperature sensor 612 may be forcedly fitted. In the embodiment shown in FIGS. 10 and 11, the notched hole 3115h may be provided as a through-hole an entrance of which is formed by opening a radially outer surface thereof.

A minimum width d1 may be formed at an entrance of the notched hole 3115h and a maximum width d2 may be formed inside of the notched hole 3115h in the radial direction, so that the first coil temperature sensor 612 may be supported as being forcedly fitted to the notched hole 3115h, and may be prevented from being radially separated.

The maximum width d2 of the notched hole 3115h may be smaller than a maximum outer diameter of the first coil temperature sensor 612, to prevent the first coil temperature sensor 612 from being separated in the vertical direction (U-D direction). As will be described hereinafter, the maximum outer diameter of the first coil temperature sensor 612 may be formed in an insulation ring 6214 or a securing ring 6215.

A position at which the maximum width d2 of the notched hole 3115h is formed may be an intermediate position between a center of the first heater 31 and a radially outer end of the first heater 31. More specifically, the first coil temperature sensor 612 may be disposed at an intermediate position between the radially (r-direction) outermost winding area and the radially (r-direction) innermost winding area of the working coil 312. The intermediate position may not mean only an exact central position mathematically and physically. This may be understood as a concept including a mathematically and physically central position, and a position adjacent to the central position.

The reason that the maximum width d2 of the notched hole 3115h is formed at the intermediate position, as described above, may reflect a phenomenon that the amount of heat generated by the working coil 312 varies depending on the location. Also, it has the purpose of sensing the temperature of the working coil 312 at a middle winding position having a greatest heat generation. As will be described hereinafter, a central axis of the first coil temperature sensor 612 may be aligned with a position at which the notched hole 3115h has the maximum width d2.

Figure 12:
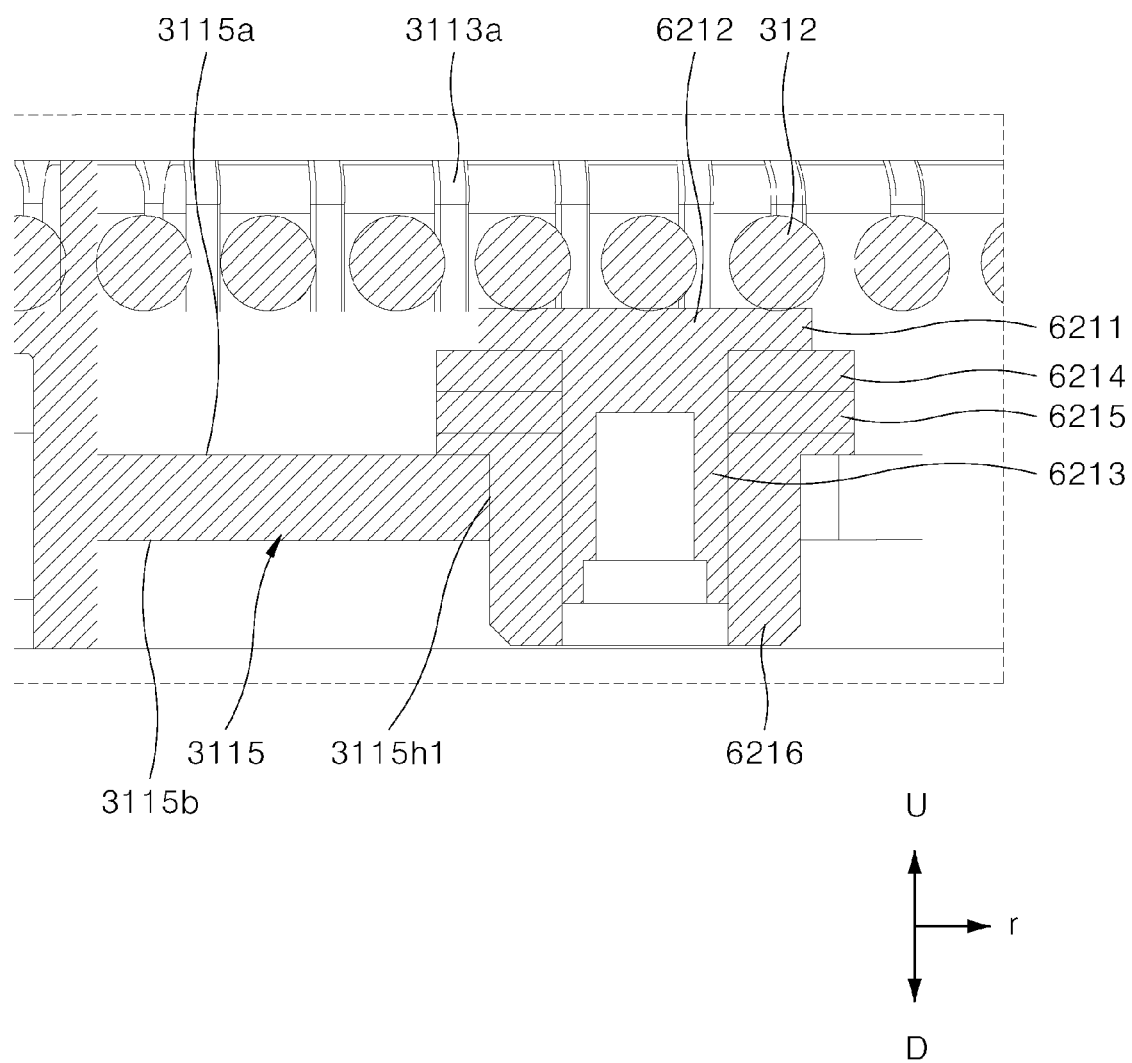
FIGS. 12 and 13 are cross-sectional views of the first heater of FIG. 7, taken along line XII-XII shown in FIG. 7.
Figure 13:
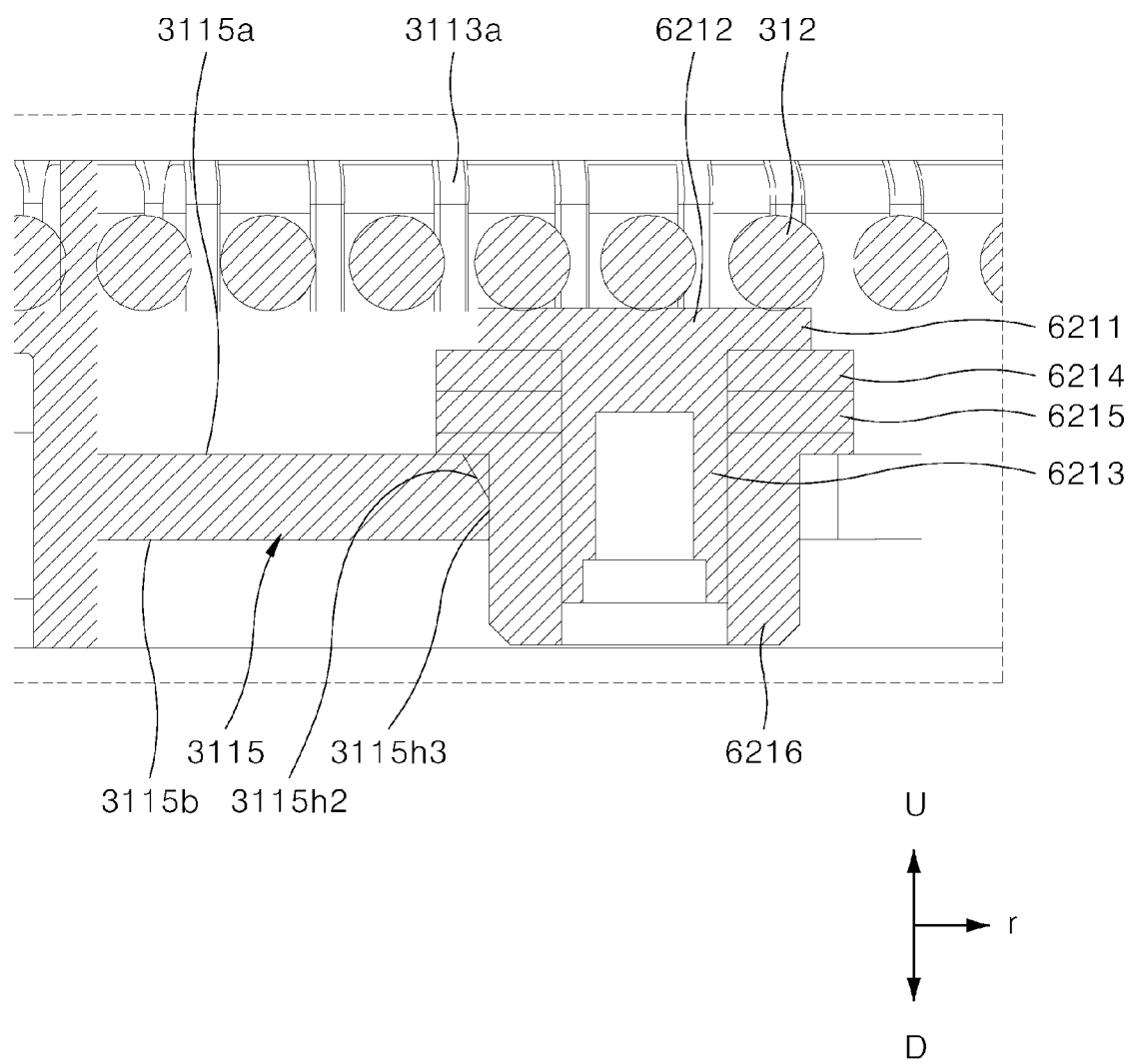

It is shown in FIGS. 12 and 13 that the first coil temperature sensor 612 is inserted in the notched hole 3115h of the sensor bracket 3115 to be installed therein. As shown in the drawings, when the first coil temperature sensor 612 is coupled to the sensor bracket 3115, an upper sensor body 6211, the insulation ring 6214 and the securing ring 6215, which are provided in the first coil temperature sensor 612, may be disposed on the upper surface 3115a of the sensor bracket 3115, and a lower sensor body 6213 of the first coil temperature sensor 612 may protrude below the lower surface of the sensor bracket 3115 through the notched hole 3115h. An elastic cover 6216 may be provided to cover at least an outer circumferential surface of the lower sensor body 6213 and a lower surface of the securing ring 6215. The elastic cover 6216 may be pressed between an inner circumferential surface 3115h1 of the notched hole 3115h and the outer circumferential surface of the lower sensor body 6213 and between an upper surface 3115a of the notched hole 3115h and the lower surface of the securing ring 6215, so that an elastically deformed state may be maintained. The elastic cover 6216 may elastically support the first coil temperature sensor 612 with respect to the sensor bracket 3115 in the vertical direction (U-D direction) and the radial direction (r-direction). For such elastic support, the elastic cover 6216 may be formed of a material having excellent impact absorption performance and strong heat resistance, and may be formed of silicone rubber, for example.

With this structure, the upper sensor body 6211, the insulation ring 6214, and the securing ring 6215 of the first coil temperature sensor 612 may be fitted between the wound working coil 312 and the upper surface 3115a of the sensor bracket 3115. Accordingly, the sensing surface 6212 formed in the upper surface of the upper sensor body 6211 may maintain contact with the working coil 312 so that it may effectively sense the temperature of the working coil 312.

However, the sensing surface 6212 of the first coil temperature sensor 612 might be separated from the working coil 312 during operation of the electric range 1, depending on a manufacturing tolerance of the notched hole 3115h and the winding state of the working coil 312. If the first coil temperature sensor 612, which is a contact temperature sensor in the same way as the first plate temperature sensor 611, is separated from the working coil 312, a significant level of error is likely to occur between an actual temperature of the working coil 312 and the temperature sensed by the first coil temperature sensor 612.

As described above, the electric range 1 according to an embodiment may include means for preventing the occurrence of such a measurement error. As shown in FIG. 13, the means for preventing the measurement error occurrence may be provided in the form of an inclined surface 3115h on the inner circumferential surface 3115h1 of the notched hole 3115h.

More specifically, the inner circumferential surface 3115h1 of the notched hole 3115h, which is in surface contact with the elastic cover 6216 of the first coil temperature sensor 612 may include an inclined surface 3115h2 having a cross sectional area that gradually expands while extending upwardly (U-direction) toward a lower area of the working coil 312. The inclined surface 3115h may be partially formed on the inner circumferential surface 3115h of the notched hole 3115h or entirely provided on the inner circumferential surface.

When the inner circumferential surface 3115h of the notched hole 3115h is formed as the inclined surface 3115h2 at least partially, a restoring force of the elastically deformed elastic cover 6216 may act on the inclined surface 3115h2 and the force pushing the first coil temperature sensor 612 in the upward direction (U-direction) as a whole may act on the first coil temperature sensor 612. Accordingly, the force applied by the inclined surface 3115h2 of the notched hole 3115*h* and the elastic cover 6216 to push the first coil temperature sensor 612 in the upward direction (U-direction), that is, a preload may continuously act so that the contact state between the sensing surface 6212 of the first coil temperature sensor 612 and the lower surface of the working coil 312 may be maintained. Separation of the sensing surface 6212 from the working coil 312 during use of the electric range 1 based on the manufacturing tolerance of the notched hole 3115*h* and a winding state of the working coil 312 may be prevented effectively as described above. When the inclined surface 3115*h*2 is partially provided on the inner circumferential surface of the notched hole 3115*h* as described in this embodiment, the inclined surface 3115*h*2 may be disposed in the upward direction (U-direction) and a vertical surface 3115*h*3 may be continuously formed with the inclined surface 3115*h*2 in the downward direction (D-direction) from the inclined surface 3115*h*2.

As another embodiment, the inclined surface for generating the preload acting on the first coil temperature sensor 612 described above may be formed on an outer circumferential surface of the elastic cover 6216 provided in the first coil temperature sensor 612. More specifically, when the outer circumferential surface of the elastic cover 6216 configured to be elastically deformed by surface contact with the inner circumferential surface 3115*h*1 of the notched hole 3115*h* is partially formed as an inclined surface, a preload for pushing the first coil temperature sensor 612 in the upward direction (U-direction) in the same manner as in the above-described embodiment.

Embodiments disclosed herein provide an electric range including a dedicated coil temperature sensor configured to measure a temperature of a working coil so as to monitor a working coil temperature in real time and actively respond to a working coil load condition, thereby remarkably increasing an operation time of the electric range. Embodiments disclosed herein further provide an electric range that may prevent unexpected operation interruption or stoppage occurring due to overloading of the working coil, thereby improving user convenience and significantly increasing product reliability.

Embodiments disclosed herein provide an electric range that may simplify an installation structure of a coil temperature, thereby reducing manufacture costs. Embodiments disclosed herein also provide an electric range that may prevent contact separation between a coil temperature sensor and a working coil, thereby preventing errors in detecting the temperature of the working coil.

Advantages are not limited to the above advantages, and other advantages that are not mentioned above can be clearly understood from the description and can be more clearly understood from the embodiments set forth herein. Additionally, the advantages can be realized via means and combinations thereof that are described in the appended claims.

An electric range according to embodiments disclosed herein may include a cover plate on which a heating target is disposed; a heating portion or heater including a working coil to which high-frequency power is applied and configured to heat the heating target using a magnetic field generated from the working coil; a plate temperature sensor disposed in the heater and configured to sense a temperature of the cover plate; and a coil temperature sensor disposed in the heater and configured to sense a temperature of the working coil, so as to monitor the working coil temperature in real time and actively respond to the working coil load condition, thereby remarkably increasing an operation time of the electric range. The plate temperature sensor may be disposed in or at a center of the heater, and the coil temperature sensor may be spaced apart from the plate temperature sensor in a radial direction outward.

The coil temperature sensor may be disposed at an intermediate position between the center of the heater and a radially outer end of the heater. The plate temperature sensor may be configured to sense the temperature of the plate by direct contact with the cover plate, and the coil temperature sensor may be configured to sense the temperature of the working coil by direct contact with the working coil.

The working coil may be spirally wound in the heater. The coil temperature sensor may be in direct contact with a lower surface of the spirally wound working coil.

The heater may include a disk portion or disk having the plate temperature sensor disposed in a center thereof, and a guide rail provided on an upper surface of the disk portion and on which the working coil is spirally wound. The disk portion and the guide rail may have a through hole formed in a vertical direction and the coil temperature sensor may be disposed in the through hole.

The electric range may further include a plurality of ferrite cores disposed under the disk portion. The through hole may be formed between the plurality of ferrite cores in a circumferential direction.

The heater may further include a sensor bracket that is disposed in the through hole and supports the coil temperature sensor under the working coil. The sensor bracket may have a flat plate shape that extends toward an inside of the through hole.

The sensor bracket may include a notched hole to which the coil temperature sensor is forcedly fitted. The notched hole may be open radially outward.

A minimum width of the notched hole may be formed at an entrance of the notched hole. A maximum width of the notched hole may be formed inside of the notched hole.

The coil temperature sensor may include a sensor body having an upper surface including a sensing surface that is in contact with a lower surface of the working coil, and an elastic cover disposed on a lower surface of the sensing surface and at least partially covering an outer surface of the sensor body. When the coil temperature sensor is coupled to the notched hole, the elastic cover may be pressed by an inner circumferential surface of the notched hole and elastically deformed.

The inner circumferential surface of the notched hole may include an inclined surface having a cross-sectional area that is gradually expanded while proceeding upwardly toward a lower area of the working coil. An outer circumferential surface of the elastic cover may include an inclined surface having a cross-sectional area that is gradually expanded while proceeding upwardly toward a lower area of the working coil. The inclined surface of the elastic cover may be in surface-contact with the inner circumferential surface of the notched hole.

Embodiments disclosed herein may have at least the following advantages. The electric range may include the dedicated coil temperature sensor disposed in the heater and configured to sense the temperature of the working coil, so as to monitor the working coil temperature in real time and actively respond to the working coil load condition, thereby remarkably increasing an operation time of the electric range. Further, the electric range may prevent unexpected operation interruption or stoppage occurring due to overloading of the working coil, thereby improving user convenience and significantly increasing product reliability.

Furthermore, the electric range may simplify an installation structure of a coil temperature, thereby reducing manufacture costs. In addition, the electric range may prevent contact separation between a coil temperature sensor and a working coil, thereby preventing errors in detecting the temperature of the working coil.

Embodiments are described above with reference to a number of illustrative embodiments thereof. However, the embodiments are not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric range, comprising:
   a cover plate on which a heating target is disposed;
   a heater comprising a working coil to which high-frequency power is applied and configured to heat the heating target using a magnetic field generated from the working coil;
   a plate temperature sensor disposed in the heater and configured to sense a temperature of the cover plate; and
   a coil temperature sensor disposed in the heater and configured to sense a temperature of the working coil, wherein the heater further comprises a sensor bracket that is disposed in a through hole of the heater and supports the coil temperature sensor under the working coil, wherein the sensor bracket comprises a hole to which the coil temperature sensor is forcedly fitted, wherein the coil temperature sensor comprises:
      a sensor body having an upper surface forming a sensing surface that is in contact with a lower surface of the working coil; and
      an elastic cover disposed on a lower surface of the sensing surface and at least partially covering an outer surface of the sensor body, and wherein when the coil temperature sensor is coupled to the hole, the elastic cover is pressed by an inner circumferential surface of the hole and elastically deformed.

2. The electric range of claim 1, wherein the plate temperature sensor is disposed at a center of the heater, and the coil temperature sensor is spaced apart from the plate temperature sensor in a radially outward direction.

3. The electric range of claim 2, wherein the coil temperature sensor is disposed at an intermediate position between the center of the heater and a radially outer end of the heater.

4. The electric range of claim 2, wherein the plate temperature sensor is configured to sense the temperature of the cover plate by direct contact with the cover plate, and the coil temperature sensor is configured to sense the temperature of the working coil by direct contact with the working coil.

5. The electric range of claim 4, wherein the working coil is spirally wound in the heater, and the coil temperature sensor is in direct contact with a lower surface of the spirally wound working coil.

6. The electric range of claim 5, wherein the heater further comprises:
 a disk portion having the plate temperature sensor disposed in a center thereof; and
 a guide rail provided on an upper surface of the disk portion and on which the working coil is spirally wound, wherein the disk portion and the guide rail have the through hole formed in a vertical direction and the coil temperature sensor is disposed in the through hole.

7. The electric range of claim 6, further comprising:
 a plurality of ferrite cores disposed under the disk portion, wherein the through hole is formed between the plurality of ferrite cores in a circumferential direction.

8. The electric range of claim 1, wherein the sensor bracket has a flat plate shape that extends toward an inside of the through hole.

9. The electric range of claim 1, wherein the hole is open in a radially outward direction.

10. The electric range of claim 9, wherein a minimum width of the hole is formed at an entrance of the hole and a maximum width of the hole is formed inside of the hole.

11. The electric range of claim 1, wherein the inner circumferential surface of the hole comprises an inclined surface having a cross-sectional area that gradually expands while extending upwardly toward a lower area of the working coil.

12. The electric range of claim 11, wherein an outer circumferential surface of the elastic cover comprises an inclined surface having a cross-sectional area that gradually expands while extending upwardly toward a lower area of the working coil.

13. The electric range of claim 12, wherein the inclined surface of the elastic cover is in surface-contact with the inner circumferential surface of the hole.

14. An electric range, comprising:
 a cover plate on which a heating target is disposed;
 a heater comprising a working coil to which high-frequency power is applied and configured to heat the heating target using a magnetic field generated from the working coil;
 a plate temperature sensor disposed in the heater and configured to sense a temperature of the cover plate; and
 a coil temperature sensor disposed in the heater and configured to sense a temperature of the working coil, wherein the plate temperature sensor is configured to sense the temperature of the cover plate by direct contact with the cover plate, and the coil temperature sensor is configured to sense the temperature of the working coil by direct contact with the working coil, wherein the heater further comprises a sensor bracket that is disposed in a through hole of the heater and supports the coil temperature sensor under the working coil, wherein the sensor bracket comprises a hole to which the coil temperature sensor is forcedly fitted, wherein the coil temperature sensor comprises:
  a sensor body having an upper surface forming a sensing surface that is in contact with a lower surface of the working coil; and
  an elastic cover disposed on a lower surface of the sensing surface and at least partially covering an outer surface of the sensor body, and wherein when the coil temperature sensor is coupled to the hole, the elastic cover is pressed by an inner circumferential surface of the hole and elastically deformed.

15. The electric range of claim 14, wherein the coil temperature sensor is disposed at an intermediate position between a center of the heater and a radially outer end of the heater.

16. The electric range of claim 14, wherein the working coil is spirally wound in the heater, and the coil temperature sensor is in direct contact with a lower surface of the spirally wound working coil.

17. The electric range of claim 14, wherein the heater further comprises:
 a disk portion having the plate temperature sensor disposed in a center thereof;
 a guide rail provided on an upper surface of the disk portion and on which the working coil is spirally wound, wherein the disk portion and the guide rail have the through hole formed in a vertical direction and the coil temperature sensor is disposed in the through hole; and
 a plurality of ferrite cores disposed under the disk portion, wherein the through hole is formed between the plurality of ferrite cores in a circumferential direction.

* * * * *